United States Patent [19]

Stegmaier

[11] Patent Number: 4,900,103
[45] Date of Patent: Feb. 13, 1990

[54] BRAKE SYSTEM WITH ANTI-SKID CONTROL FOR MOTOR VEHICLES

[75] Inventor: Alwin Stegmaier, N. Charleston, S.C.

[73] Assignee: Robert Bosch GmbH, Stuttgart, Fed. Rep. of Germany

[21] Appl. No.: 332,194

[22] Filed: Apr. 3, 1989

[30] Foreign Application Priority Data

May 20, 1988 [DE] Fed. Rep. of Germany ....... 3817180

[51] Int. Cl.$^4$ ............................ B60T 8/32; B60T 8/44
[52] U.S. Cl. ..................................... 303/114; 303/52; 303/119; 303/92; 60/550
[58] Field of Search ................... 303/114, 119, 52, 56, 303/92, 110, 116; 188/181 A, 345; 60/545, 547.1, 550, 591, 550

[56] References Cited

U.S. PATENT DOCUMENTS

| | | | |
|---|---|---|---|
| 4,620,750 | 11/1986 | Leiber | 303/114 |
| 4,624,108 | 11/1986 | Leiber | 303/114 X |
| 4,678,243 | 7/1987 | Leiber | 303/114 |
| 4,715,661 | 12/1987 | Leiber | 303/119 X |
| 4,776,646 | 10/1988 | Siegel | 303/114 |
| 4,832,416 | 5/1989 | Kaes et al. | 303/110 |
| 4,832,417 | 5/1989 | Kehl et al. | 303/114 |
| 4,834,467 | 5/1989 | Zirps | 303/114 |

FOREIGN PATENT DOCUMENTS

3612793 10/1986 Fed. Rep. of Germany .
2174161 10/1986 United Kingdom .

Primary Examiner—Douglas C. Butler
Attorney, Agent, or Firm—Edwin E. Greigg

[57] ABSTRACT

A brake system having anti-skid control for motor vehicles has a brake booster having a brake valve and an emergency brake piston, and a master brake cylinder, combined in one housing with the brake booster having a master brake piston and two separate brake chambers, which supply brake fluid to one dynamic brake circuit and one static brake circuit (II and I), respectively. If the pressure fails, the master brake piston is mechanically actuated via the emergency brake piston. To attain a simple structure with a feedback-free brake pedal during anti-skid control, the emergency brake piston and the master brake piston are accommodated in a continuous housing bore such that the emergency brake piston forms the second defining wall for the first brake chamber, and the master brake piston rests with force on the emergency brake piston. A device for restoring the emergency brake piston upon the onset of the anti-skid control assure free mobility of the master brake piston. The brake pressure modulations are effected by a switching valve connected to the first brake chamber.

21 Claims, 2 Drawing Sheets

BRAKE SYSTEM WITH ANTI-SKID CONTROL FOR MOTOR VEHICLES

BACKGROUND OF THE INVENTION

The invention is based on a brake system with anti-skid control for motor vehicles.

In a known brake system with anti-skid control (German Offenlegungsschrift 36 12 793), both brake circuits are so-called static brake circuits, into which a brake pressure determined by the brake pedal stroke is fed, each from one brake chamber of the master brake cylinder. Such brake systems have a high hydraulic power requirement.

In a brake system of the type initially referred to above, contrarily, upon actuation of the brake pedal brake pressure is fed directly from the pressure reservoir into the dynamic brake circuit, which preferably includes the wheel brake cylinders of the two rear wheels. At the same time, the first brake chamber of the master brake cylinder is acted upon by this brake pressure, which causes the master brake piston to be displaced and a corresponding brake pressure for the static brake circuit of the front wheels to be built up in the second brake chamber of the master brake cylinder. If the pressure should fail, then by means of brake pedal actuation, the master brake piston is displaced via the emergency brake piston, so that brake pressure is generated only in the static brake circuit. Brake systems of this kind are structurally simpler.

In a known brake system of this type, the master brake piston and the emergency brake piston are disposed in separate work cylinders and mechanically connected to one another via a tappet extending through the partition between two work cylinders. The brake pedal is coupled to the emergency brake piston via a brake rod, which after a displacement travel sufficient for brake valve control, in the event of a disruption in pressure generation, form-fittingly carries the emergency brake piston along with it in the displacement direction. The partition defines the first brake chamber of the master brake cylinder on one side, and on the other a counterpressure or return chamber of the emergency brake piston, into which chamber, upon anti-skid control, a variably high pressure is fed for pressure modulation; this pressure urges the emergency brake piston in the restoring direction, as a result of which the master brake piston effects a brake pressure modulation in the brake circuits. The pressure modulations in the restoring chamber are transmitted in full to the brake pedal and are annoyingly perceptible by the driver.

OBJECT AND SUMMARY OF THE INVENTION

The brake system according to the invention has an advantage over the prior art that in anti-skid control there is no feedback to the pedal at all. Furthermore, a simple, integrated, coaxial design of the master brake cylinder and the brake booster is attained. This, and the absence of a need for many valves for the anti-skid control, makes for economical manufacture of the brake system, which in turn makes the brake system of the invention of interest for motor vehicles of the middle to lower price range, where the freeing of the brake pedal during anti-skid control is perceived as comfortable and makes a good impression.

In an advantageous feature of the invention, the reservoir pressure effects a blocking of the emergency brake piston in its undisplaced basic position in a simple manner. The master brake piston thus moves away from the emergency brake piston and can move freely in the event of pressure modulation. When the brake valve is integrated with the emergency piston as provided herein, the inlet chamber of the brake valve simultaneously embodies the counterpressure chamber for the emergency brake piston as well.

In a different embodiment of the invention, the emergency brake piston, upon brake pedal actuation, is moved out of its basic position and remains in contact by force with the master brake piston. As a result, upon the triggering of the brake valve integrated with the emergency brake piston, a longer brake pedal travel is attained, which makes for better metering of the brake force by the driver than in the case of a so-called button pressure brake of the embodiment referred to above. With the onset of anti-skid control, the counterpressure chamber is subjected to pressure, and the emergency brake piston is returned to its undisplaced basic position. In the same manner, the master brake piston is now freely movable for brake pressure modulation.

The invention will be better understood and further objects and advantages thereof will become more apparent from the ensuing detailed description of preferred embodiments taken in conjunction with the drawings.

DESCRIPTION OF THE PREFERRED EMBODIMENT

Figure 1:
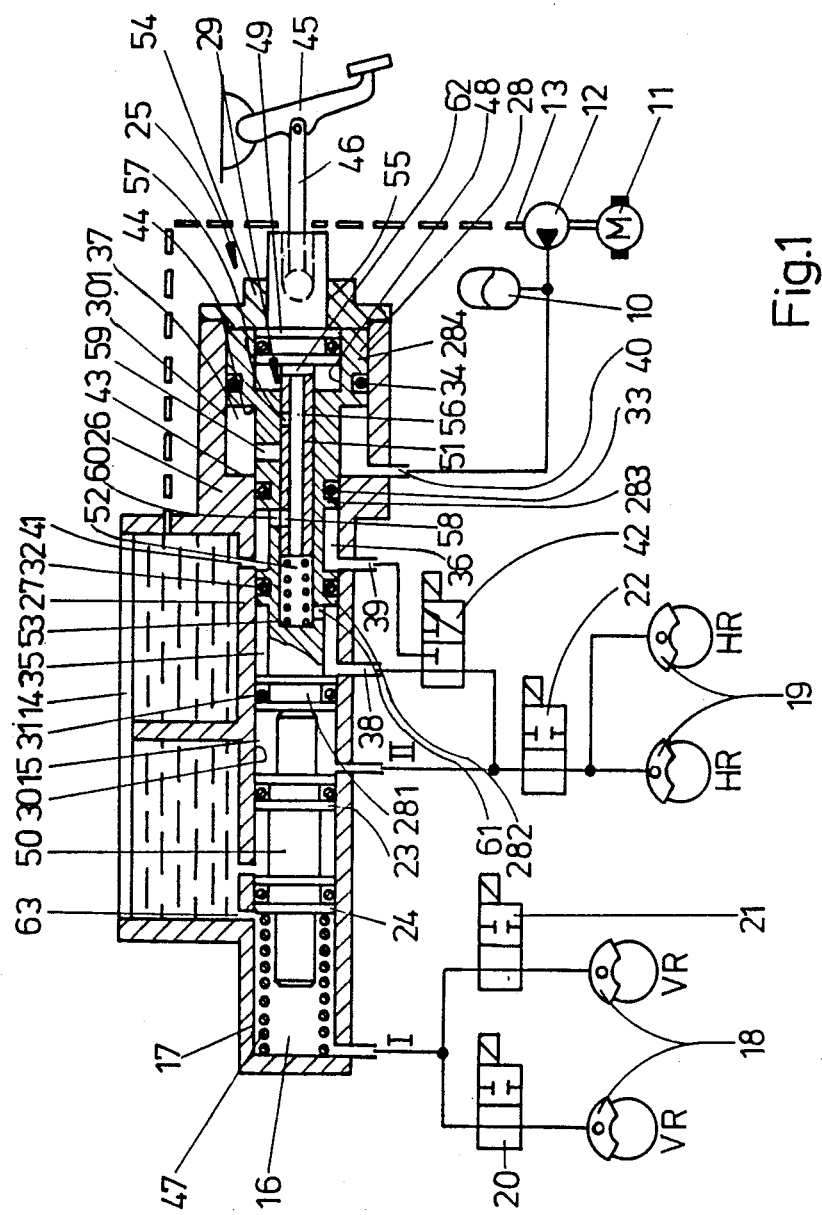
FIG. 1 schematically shows a first exemplary embodiment of a hydraulic brake system having anti-skid control for motor vehicles.

The hydraulic brake system schematically sketched in the drawing is supplied from a pressure reservoir 10, which is pressurized to a predetermined pressure by a hydraulic pump 12 driven by an electric motor 11. The pressure fluid, in this instance brake fluid, is aspirated by the hydraulic pump 12 via an intake line 13 from a supply container 14, into which the pressure fluid flows back again via various return lines. The brake system has two separate brake circuits I and II, of which the brake circuit I that supplies brake pressure to the front wheels VR is a so-called static brake circuit, and the brake circuit II that supplies brake pressure to the rear wheels HR is a so-called dynamic brake circuit. Each brake circuit I and II is connected to a separate brake chamber 15, 16 of a master brake cylinder 17. The wheel brake cylinders 18 of the front wheels VR are supplied via separate brake lines, while a common brake line leads to the wheel brake cylinders 19 of the rear wheels HR. A brake pressure maintenance valve 20-22 is connected in a known manner to each of the brake lines. A so-called tandem master brake piston 50 is axially displaceably guided in the master brake cylinder 17 and comprises two master brake pistons 23, 24 disposed axially in line with one another and fixedly connected to one another. One master brake piston 23 or 24 defines one of the brake chambers 15, 16.

The master brake cylinder 17 is structurally combined with a brake booster 25 in a common housing 26. The brake booster 25 has a booster cylinder 27, an emergency brake piston 28 displaceable therein, and a brake valve 29 integrated with the emergency brake piston 28. The master brake cylinder 17 and booster cylinder 27 are embodied by a cylindrical continuous housing bore 30, which has a bore segment 301 of enlarged diameter in the vicinity of the booster cylinder 27. The emergency brake piston 28 has a total of four piston segments 281-284, which are sealed off with respect to the inner wall of the housing bore 30 by means of seals 31-34. Various chambers are defined by the individual piston segments 281-284. The outermost piston segment 281 forms the second defining wall for the first brake chamber 15 defined by the master brake piston 23. The first piston segment 281 and the second piston segment 282 define an outlet chamber 35 of the brake valve 29; the piston segment 282 and the piston segment 283 define a relief chamber 36 of the brake valve 29; and the piston segments 283 and 284 seal off an inlet chamber 37 of the brake valve 29. One connecting bore 38-40 extending radially through the housing 26 discharges into each of the chambers 35-37; the relief chamber 36 additionally communicates via an outflow bore 41 with the supply container 14. Via the connecting bore 38, the outlet chamber 35 communicates with the first brake chamber 15 and hence with the dynamic brake circuit II, while the inlet chamber 37 communicates continuously with the pressure reservoir 10 via the connecting bore 40. A 3/2-way magnetic valve 42 is incorporated into the connecting line between the outlet chamber 35 and the first brake chamber 15; in its unexcited basic position the magnetic valve 42 opens up the communication between the two chambers 15, 35 and in its excited working position the magnetic valve 42 connects the first chamber 15 with the relief chamber 36 via the connecting bore 39. The inlet chamber 37 of the brake valve 29 is defined in the axial direction on one side by a radially extending annular shoulder 43, formed at the transition between the housing bore 30 and the bore segment 301 of enlarged diameter, and on the other by a face 44 of the fourth piston segment 284 extending transversely to the axial direction and located opposite the annular shoulder 43, thus simultaneously forming a counterpressure chamber for the emergency brake piston 28, because since the inlet chamber 37 communicates continuously with the pressure reservoir 10, the emergency brake piston 28, in its undisplaced basic position shown in FIG. 1, is blocked against axial displacement when the pressure reservoir 10 is under pressure. If the reservoir pressure fails because of some disruption, the emergency brake piston 28 will be mechanically displaced via a brake pedal 45, which is coupled to it via a brake rod 46. Since the tandem master brake piston 50, under the influence of a restoring spring 47, rests with force against the piston segment 281, it is displaced in the same way (emergency braking operation) upon axial displacement of the emergency brake piston 28.

On the face end toward the brake pedal 45, the emergency brake piston 28 has a recess 48 open at its face end, in which a sealing piston 49 that is pivotably connected to the brake rod 46 is axially displaceably guided. The sealing piston 49 is firmly connected to a control slide 51 of the brake valve 29, which is axially displaceably guided in an axial blind bore 52 in the emergency brake piston 29 and is loaded by a soft restoring spring 53 supported on the bottom of the blind bore 52. The recess 48 is closed off by a housing cap 54 mounted on the face end of the housing 26. The sealing piston 49 protrudes out of the face end of the housing 26 through a duct 55 in the housing cap 54. The control slide 51, in a known manner, has an axially longitudinal continuous central bore 56, and two control bores 57, 58 extending radially from it. The control bores 57, 58 cooperate with two radial connecting bores 59, 60 on the emergency brake piston 28, of which the connecting bore 59 discharges into the inlet chamber 37 and the connecting bore 60 discharges into the relief chamber 36. The blind bore 27 also communicates continuously, via a bore 61, with the outlet chamber 35. Through a transverse bore 62, the central bore 56 is in continuous communication with the recess 48.

The mode of operation of the above-described brake system is as follows:

In the basic position of the brake pedal 45, the restoring spring 53 causes the control slide 51 to remain in its basic position. The central bore 56 of the control slide 51 communicates with the relief chamber 36 via the control bore 58. The outlet chamber 35 and the two brake chambers 15, 16 are thus without pressure. The inlet chamber 37 is at reservoir pressure. An actuation of the brake pedal 45 first, via the pedal rod 46, causes a displacement of the control slide 51, in such a way that the communication of the central bore 56 with the relief chamber 36 is blocked off and the communication of the central bore 56 with the inlet chamber 37 is established. Pressure fluid that is at reservoir pressure now flows out of the inlet chamber 37 into the outlet chamber 35, and from there via the unexcited 3/2-way magnetic valve 42 into the dynamic brake circuit II and simultaneously into the first brake chamber 15. The pressure building up in the brake chamber 15 displaces the tandem master brake piston 50 counter to the restoring spring 47. As a result of this displacement, the master brake piston 24 closes an opening 63 to the supply container 14. By means of a further displacement of the tandem master brake piston 50, brake pressure is now built up in the brake chamber 16 as well, and is fed into the static brake circuit I. Since because of the reservoir pressure prevailing in the inlet chamber 37 the emergency brake piston 28 remains fixed in its basic position, the tandem master brake piston 50 moves away from the emergency brake piston 28. An increasing pressure is built up in both brake circuits I and II, as long as the control bore 57 is flush with the connecting bore 59 so that the inlet chamber 37 thus remains in communication with the outlet chamber 35 of the brake valve 29. If the brake pedal 45 is retracted slightly, then both control bores 57, 58 are closed, and the brake pressure that has been fed in is maintained.

After the initiation of a braking event, if the brake pedal 45 is too forcefully actuated, so that the wheel brakes grab too hard and cause undesirable wheel slip or in other words lose traction, then the anti-skid control comes into play. Based on the wheel slip, detected by wheel sensors (not shown), switching signals are generated for the 3/2-way magnetic valve 42. This valve is switched over and connects the first brake chamber 15 to the relief chamber 36, while the outlet chamber 35 of the brake valve 29 is shut off. The pressure is thus built up simultaneously in both the brake chamber 15 and the dynamic brake circuit II, and the tandem master brake piston 50 displaces in the direction of brake pressure reduction, causing the pressure in the brake chamber 16 and thus in the static brake circuit I to decrease as well. A periodic switching of the 3/2-way magnetic valve 42 causes a modulation in brake pressure, until the wheel slip has been compensated for. In this anti-skid control, because of the brake pressure maintenance valves 20-22, only the wheel brake cylinders 18 or 19 that are associated with wheels exhibiting slip are temporarily connected to the brake chambers 15, 16. The other wheel brake cylinders 18, 19 are disconnected from the brake chambers 15, 16 during anti-skid control because of the brake pressure maintenance valves 20-22 which have been switched over to the pressure maintenance position. The two rear wheels HR, however, are always regulated in common with one another.

During emergency braking operation, or in other words if the reservoir pressure fails, the emergency brake piston 28 is displaced by the sealing piston 49 upon actuation of the brake pedal 45, and in turn displaces the tandem master brake piston 50. The second brake chamber 16, filled with pressure fluid, is disconnected from the supply container 14. The brake pressure built up in the brake chamber 16 causes braking of the front wheels VR.

Figure 2:
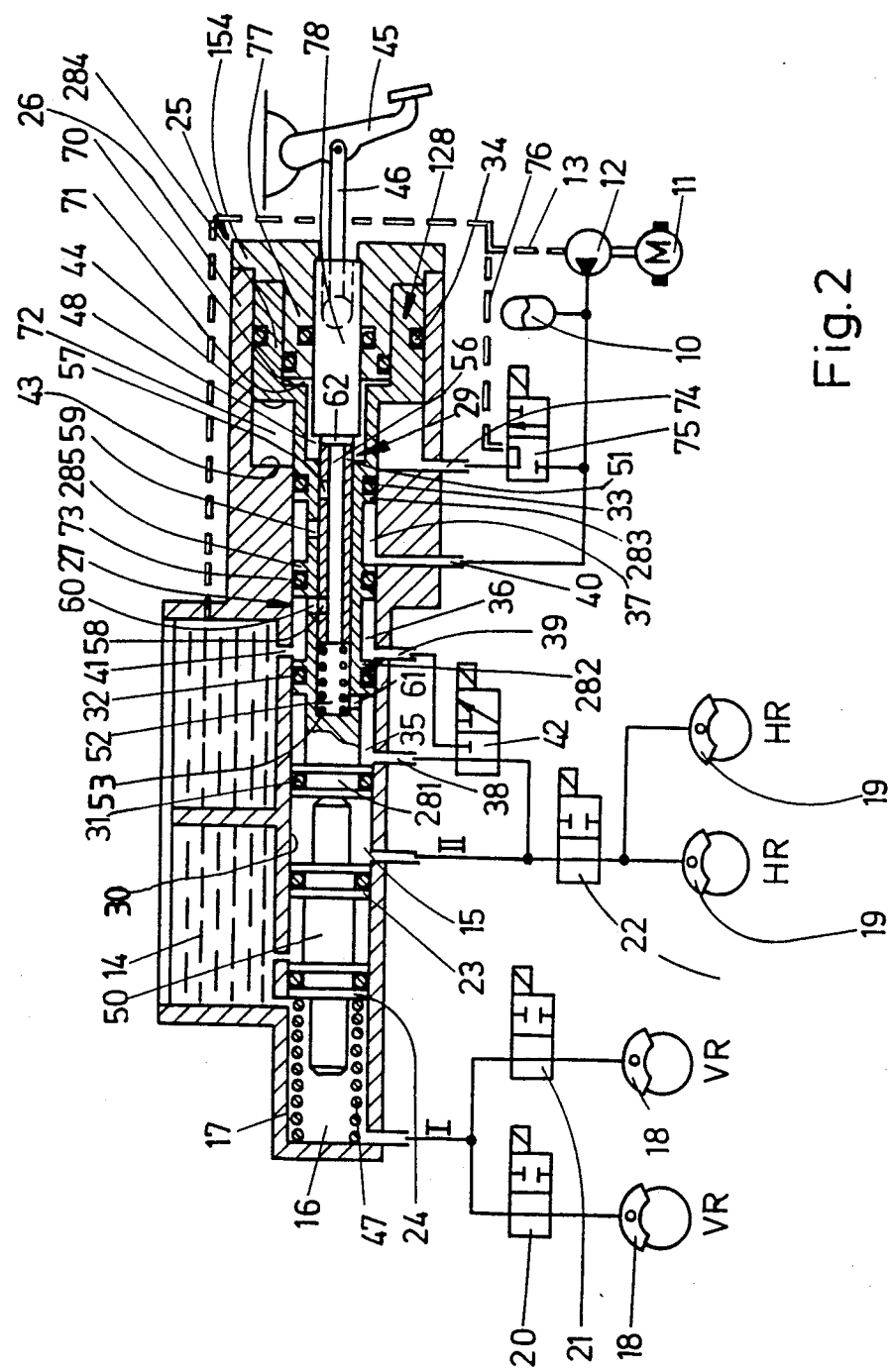
FIG. 2 schematically shows a second exemplary embodiment of such a brake system.

The brake system schematically shown in FIG. 2 is largely identical to that described above; hence identical components are provided with the same reference numerals. Unlike the brake system of FIG. 1, in this brake system the brake piston 128 is modified, such that with a radial piston face 70 oriented away from its displacement direction, it defines a work chamber 71, which via the transverse bore 62 and the central bore 56 in the control slide 51 communicates continuously with the outlet chamber 35 of the brake valve and can be made to communicate in alternation, via the control bores 57 and 58, with the inlet chamber 37 and the relief chamber 36 of the brake valve 29. The blocking function of the inlet chamber 37 is cancelled and assigned to a separate counterpressure or restoring chamber 72, which now is defined by the annular shoulder 43 of the bore segment 301 of enlarged cross section and the annular piston face 44, opposite it, of the piston segment 284. Between the second and third piston segments 282 and 283, a fifth piston segment 285 is provided, which rests with a seal 73 on the inner wall of the housing bore 30 and divides the relief chamber 36 from the adjoining inlet chamber 37. Via a radial connecting bore 74 in the housing 26, the restoring chamber 72 communicates with a connection of a 3/2-way magnetic valve 75, the second connection of which communicates via a return line 76 with the supply container 14, or with the intake line 13 of the pump 14. The third of the three controlled connections of the 3/2-way valve 75 is connected to the pressure reservoir 10. The work chamber 71, adjoining the recess 48 in the axial direction and operatively connected with it, is closed off by the housing cap 154, which with a hollow-cylindrical portion 77 protrudes into a portion of the recess 48 of enlarged diameter and is sealed off from the inner wall of the recess. A slide body 78, firmly connected to the control slide 51 and engaged by the brake rod 46 of the brake pedal 45, is guided in the interior of the hollow-cylindrical portion 77.

The mode of operation of this second brake system embodiment is like that of the first, except that for feeding in a predetermined brake pressure, the brake pedal 45 must cover a predetermined displacement travel. As a result, the driver can meter the brake pressure more accurately than in the first brake system described above. With the feeding of brake pressure into the brake chamber 15 and thus into the dynamic brake circuit II, the work chamber 71 is also subjected to reservoir pressure. As a result, the emergency brake piston 28 is likewise displaced and remains in contact with the tandem master brake piston 50. If the anti-skid control then comes into play, the 3/2-way magnetic valve 75 is switched over in response to the first switching signal, causing the restoring chamber 72 to be filled with reservoir pressure, which displaces the emergency brake piston 128 back in the opposite direction until it reaches its undisplaced basic position. As a result, the emergency brake piston 128 moves away again from the tandem master brake piston 50, and the latter piston is now freely axially movable for pressure modulation.

If no pressure is built up in the pressure reservoir 10 because of some malfunction, then as in the brake system of FIG. 1, emergency braking can be performed via the brake pedal 45. Upon actuation of the brake pedal 45, the slide body 78 displaces until it meets the bottom of the recess 48 on the emergency brake piston 128 and displaces that piston in the axial direction. Via the piston segment 281, the tandem master brake piston 50 is also displaced counter to the force of the restoring spring 47, thus causing a pressure to be built up in the second brake chamber 16. The vehicle is braked solely via the static brake circuit I, that is, with the front wheels VR.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A brake system including anti-skid control for motor vehicles, having a brake booster, a brake valve that is controllable by a brake pedal, an emergency brake piston that is displaceable by the brake pedal at least in an event of pressure failure, having a master brake cylinder that is combined in one housing with the brake booster, said master brake cylinder has at least one master brake piston which defines two brake chambers disposed in one dynamic brake circuit and one static brake circuit, respectively, for feeding a brake pressure into the brake circuits, said first brake chamber is located in the dynamic brake circuit and can be made to communicate via the brake valve with a pressure source (10) or a relief point, said emergency brake piston (28; 128) and the master brake piston (50) are accommodated in a continuous housing bore (30) in such a manner that said emergency brake piston (28; 128) forms a second defining wall (281) for said first brake chamber (15) and the master brake piston (50) rests with force on the emergency brake piston (28; 128); means are provided that at least upon the onset of an anti-skid control keep said emergency brake piston (28; 128) in its undisplaced basic position or returns said emergency brake piston to its basic position; and at least one switching valve (42) is connected to the first brake chamber (15) for pressure modulation in the first brake chamber (15).

2. A brake system as defined by claim 1, in which said switching valve is embodied as a first 3/2-way magnetic valve (22), which with its first and second connection is incorporated into a connection between said brake valve (29) and said first brake chamber (15) and a third connection communicates with a relief point (36, 41, 14), and a second 3/2-way magnetic valve (42), preferably in its unexcited basic position, connects said first brake chamber (1) to the outlet of said brake valve (29).

3. A brake system as defined by claim 2, in which said means for holding or restoring said emergency brake piston (28; 128) includes a counterpressure chamber (37; 72) that communicates with said pressure source (10), which chamber is defined in the housing bore (30) on one side by an annular piston face (44) extending transversely to an axial direction of said emergency brake piston (28; 128) and oriented in its displacement direction, and on its other side by an annular housing shoulder (43) formed by a bore step (301).

4. A brake system as defined by claim 3, in which said brake valve (29) is integrated with said emergency brake piston (28; 128) and has a control slide (51) coupled to said brake pedal (45), said central slide has an axial central bore (56) and radial control bores (57, 58) that discharges into said central bore, said radial control bores cooperate with radial connecting bores (59, 60) in said emergency brake piston (28; 128); said first radial connecting bore (59) discharges into an inlet chamber (37) that communicates with said pressure source (10) and a second connecting bore (60) discharges into a relief chamber (36) that communicates with the relief point (14); and an outlet chamber (35), which is connectable to the first brake chamber (15) via the switching valve (42), is in continuous communication with said central bore (56) of the control slide (51).

5. A brake system as defined by claim 4, in which a counterpressure chamber simultaneously embodies the inlet chamber (37) of the brake valve (29).

6. A brake system as defined by claim 3, in which said emergency brake piston (128) in combination with a radial piston face (70) oriented away from its displacement direction, defines a work chamber (71) that is subjected to pressure via the brake valve (29) for piston displacement; and a switchover valve (75) incorporated into a connection between the counterpressure chamber (72) and said pressure source (10), for a connection of a counterpressure chamber (72) in alternation to the pressure source (10) and the relief point (76, 14).

7. A brake system as defined by claim 6, in which said switchover valve is embodied as a 3/2-way magnetic valve (75), which with a first connection is connected to said counterpressure chamber (72), and with a second connection is connected to said relief point (76, 14), and with a third connection is connected to the pressure source (10), and which in its unexcited basic position, connects said counterpressure chamber (72) to the relief point (76, 14).

8. A brake system as defined by claim 2, in which said brake valve (29) is integrated with said emergency brake piston (28; 128) and has a control slide (51) coupled to said brake pedal (45), said central slide has an axial central bore (56) and radial control bores (57, 58) that discharges into said central bore, said radial control bores cooperate with radial connecting bores (59, 60) in said emergency brake piston (28; 128); said first radial connecting bore (59) discharges into an inlet chamber (37) that communicates with said pressure source (10) and a second connecting bore (60) discharges into a relief chamber (36) that communicates with the relief point (14); and an outlet chamber (35), which is connectable to the first brake chamber (15) via the switching valve (42), is in continuous communication with said central bore (56) of the control slide (51).

9. A brake system as defined by claim 8, in which a counterpressure chamber simultaneously embodies the inlet chamber (37) of the brake valve (29).

10. A brake system as defined by claim 1, in which said means for holding or restoring said emergency brake piston (28; 128) includes a counterpressure chamber (37; 72) that communicates with said pressure source (10), which chamber is defined in the housing bore (30) on one side by an annular piston face (44) extending transversely to an axial direction of said emergency brake piston (28; 128) and oriented in its displacement direction, and on its other side by an annular housing shoulder (43) formed by a bore step (301).

11. A brake system as defined by claim 10, in which said brake valve (29) is integrated with said emergency brake piston (28; 128) and has a control slide (51) coupled to said brake pedal (45), said central slide has an axial central bore (56) and radial control bores (57, 58) that discharges into said central bore, said radial control bores cooperate with radial connecting bores (59, 60) in said emergency brake piston (28; 128); said first radial connecting bore (59) discharges into an inlet chamber (37) that communicates with said pressure source (10) and a second connecting bore (60) discharges into a relief chamber (36) that communicates with the relief point (14); and an outlet chamber (35), which is connectable to the first brake chamber (15) via the switching valve (42), is in continuous communication with said central bore (56) of the control slide (51).

12. A brake system as defined by claim 11, in which a counterpressure chamber simultaneously embodies the inlet chamber (37) of the brake valve (29).

13. A brake system as defined by claim 10, in which said emergency brake piston (128) in combination with a radial piston face (70) oriented away from its displacement direction, defines a work chamber (71) that is subjected to pressure via the brake valve (29) for piston displacement; and a switchover valve (75) incorporated into a connection between the counterpressure chamber (72) and said pressure source (10), for a connection of a counterpressure chamber (72) in alternation to the pressure source (10) and the relief point (76, 14).

14. A brake system as defined by claim 13, in which said switchover valve is embodied as a 3/2-way magnetic valve (75), which with a first connection is connected to said counterpressure chamber (72), and with a second connection is connected to said relief point (76, 14), and with a third connection is connected to the pressure source (10), and which in its unexcited basic position, connects said counterpressure chamber (72) to the relief point (76, 14).

15. A brake system as defined by claim 14, in which said work chamber (71) is in continuous communication with the central bore (56) of the control slide (51).

16. A brake system as defined by claim 13, in which said work chamber (71) is in continuous communication with the central bore (56) of the control slide (51).

17. A brake system as defined by claim 1, in which said brake valve (29) is integrated with said emergency brake piston (28; 128) and has a control slide (51) coupled to said brake pedal (45), said central slide has an axial central bore (56) and radial control bores (57, 58) that discharges into said central bore, said radial control bores cooperate with radial connecting bores (59, 60) in said emergency brake piston (28; 128); said first radial connecting bore (59) discharges into an inlet chamber (37) that communicates with said pressure source (10) and a second connecting bore (60) discharges into a relief chamber (36) that communicates with the relief point (14); and an outlet chamber (35), which is connectable to the first brake chamber (15) via the switching valve (42), is in continuous communication with said central bore (56) of the control slide (51).

18. A brake system as defined by claim 17, in which a counterpressure chamber simultaneously embodies the inlet chamber (37) of the brake valve (29).

19. A brake system as defined by claim 17, in which said emergency brake piston (128) in combination with a radial piston face (70) oriented away from its displacement direction, defines a work chamber (71) that is subjected to pressure via the brake valve (29) for piston displacement; and a switchover valve (75) incorporated into a connection between the counterpressure chamber (72) and said pressure source (10), for a connection of a counterpressure chamber (72) in alternation to the pressure source (10) and the relief point (76, 14).

20. A brake system as defined by claim 19, in which said switchover valve is embodied as a 3/2-way magnetic valve (75), which with a first connection is connected to said counterpressure chamber (72), and with a second connection is connected to said relief point (76, 14), and with a third connection is connected to the pressure source (10), and which in its unexcited basic position, connects said counterpressure chamber (72) to the relief point (76, 14).

21. A brake system as defined by claim 17, in which said work chamber (71) is in continuous communication with the central bore (56) of the control slide (51).

* * * * *